US012799422B2

(12) United States Patent
Tatsumi et al.

(10) Patent No.: US 12,799,422 B2
(45) Date of Patent: Nov. 17, 2026

(54) LUBRICANT COMPOSITION

(71) Applicant: IDEMITSU KOSAN CO., LTD., Tokyo (JP)

(72) Inventors: Hiroyuki Tatsumi, Tokyo (JP); Kazushige Matsubara, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 18/836,902

(22) PCT Filed: Mar. 17, 2023

(86) PCT No.: PCT/JP2023/010504

§ 371 (c)(1),
(2) Date: Aug. 8, 2024

(87) PCT Pub. No.: WO2023/189695

PCT Pub. Date: Oct. 5, 2023

(65) Prior Publication Data

US 2025/0145903 A1 May 8, 2025

(30) Foreign Application Priority Data

Mar. 30, 2022 (JP) ................................ 2022-056524

(51) Int. Cl.

| | |
|---|---|
| ***C10M 141/10*** | (2006.01) |
| ***C10M 133/44*** | (2006.01) |
| ***C10M 135/36*** | (2006.01) |
| ***C10M 137/04*** | (2006.01) |
| ***C10M 169/04*** | (2006.01) |
| *C10N 20/02* | (2006.01) |
| *C10N 40/00* | (2006.01) |
| *C10N 40/04* | (2006.01) |
| *F16H 57/04* | (2010.01) |
| *H02K 7/116* | (2006.01) |
| *H02K 9/19* | (2006.01) |

(52) U.S. Cl.

CPC ........ *C10M 141/10* (2013.01); *C10M 133/44* (2013.01); *C10M 135/36* (2013.01); *C10M 137/04* (2013.01); *C10M 169/04* (2013.01); *C10M 2203/1006* (2013.01); *C10M 2215/30* (2013.01); *C10M 2219/106* (2013.01); *C10M 2223/04* (2013.01); *C10N 2020/02* (2013.01); *C10N 2040/04* (2013.01); *C10N 2040/40* (2020.05); *F16H 57/0476* (2013.01); *H02K 7/116* (2013.01); *H02K 9/19* (2013.01)

(58) Field of Classification Search

CPC .............. C10M 141/10; C10M 133/44; C10M 135/36; C10M 137/04; C10M 169/04; C10M 2219/106; C10M 2223/04; C10N 2040/40; C10N 2040/14

See application file for complete search history.

(56) References Cited

U.S. PATENT DOCUMENTS

| | | | | |
|---|---|---|---|---|
| 4,260,501 | A * | 4/1981 | Shim | C10M 141/08 508/273 |
| 4,519,928 | A * | 5/1985 | Braid | C10M 133/44 548/257 |
| 5,185,090 | A | 2/1993 | Ryer et al. | |
| 11,214,755 | B2 * | 1/2022 | Susukida | C10M 169/04 |
| 2008/0161215 | A1 * | 7/2008 | Koshima | C10M 137/105 508/432 |
| 2010/0009880 | A1 | 1/2010 | Okada | |
| 2014/0051618 | A1 | 2/2014 | Okada | |
| 2017/0145337 | A1 * | 5/2017 | Masuda | C10M 135/20 |
| 2017/0190996 | A1 * | 7/2017 | Manabe | C10M 135/10 |
| 2020/0332218 | A1 | 10/2020 | Susukida et al. | |
| 2021/0230496 | A1 | 7/2021 | Miatt et al. | |
| 2023/0120889 | A1 | 4/2023 | Matsubara et al. | |
| 2025/0313774 | A1 * | 10/2025 | Matsubara | C10M 137/105 |

FOREIGN PATENT DOCUMENTS

| | | | |
|---|---|---|---|
| EP | 4433564 | B1 | 8/2025 |
| JP | 2017-171869 | A | 9/2017 |
| JP | 2020-172642 | A | 10/2020 |
| WO | WO 2008/038701 | A1 | 4/2008 |
| WO | WO 2015/194236 | A1 | 12/2015 |
| WO | WO 2021/193869 | A1 | 9/2021 |

OTHER PUBLICATIONS

International Search Report issued on May 30, 2023 in PCT/JP2023/010504, filed on Mar. 17, 2023, 2 pages.
Extended European Search dated Feb. 2, 2026, in European Patent Application No. 23779713.9, 9 total pages.
Office Action dated Feb. 3, 2026, in Japanese Patent Application JP 2022-056524 with English translation, (8 pages).

* cited by examiner

*Primary Examiner* — Ellen M Mcavoy
(74) *Attorney, Agent, or Firm* — Oblon, McClelland, Maier & Neustadt, L.L.P.

(57) ABSTRACT

A lubricating oil composition may contain a base oil (A), a phosphorous acid ester (B) having at least one sulfur atom-containing group having 2 to 20 carbon atoms, the sulfur atom-containing group having at least one —$(S)_x$— group (x is an integer of 1 or more) between two adjacent carbon atoms in a structure of an alkyl group, a thiadiazole-based compound (C), and a benzotriazole-based compound (D). A content of the component (C) may be 0.01 mass % or more and less than 0.60 mass %, based on the total mass of the lubricating oil composition. A content of the component (D) is 0.02 mass % or more and less than 0.20 mass %, based on the total mass of the lubricating oil composition.

14 Claims, No Drawings

LUBRICANT COMPOSITION

CROSS-REFERENCE TO RELATED APPLICATIONS

The present application is the national stage of international application PCT/JP2023/010504, filed on Mar. 17, 2023, and claims the benefit of the filing date of Japanese Appl. No. 2022-056524, filed on Mar. 30, 2022.

TECHNICAL FIELD

The present invention relates to a lubricating oil composition, an electrically driven unit, and a method for using a lubricating oil composition.

BACKGROUND ART

Various apparatuses such as an engine, a transmission, a speed reducer, a compressor and a hydraulic system have mechanisms such as a torque converter, a clutch, a gear bearing mechanism, an oil pump and a hydraulic control mechanism. In these mechanisms, lubricating oil compositions are used, and lubricating oil compositions capable of meeting various requirements have been developed.

For example, development of an electrically driven unit including a motor, a gearbox, and an inverter has been advanced in recent years, and a lubricating oil composition suitable for this electrically driven unit has been desired. In Patent Literature 1, an invention relating to a lubricating oil composition that can be preferably used as a lubricating oil used for an electrically driven unit and contains a prescribed phosphorous acid ester derivative and a thiadiazole derivative is disclosed.

CITATION LIST

Patent Literature

Patent Literature 1: International Publication No. WO 2021/193869

SUMMARY OF INVENTION

Technical Problem

For example, the above-mentioned lubricating oil composition used for an electrically driven unit requires characteristics of scuffing resistance, copper corrosion resistance, etc. That is to say, a novel lubricating oil composition having characteristics (e.g., scuffing resistance, copper corrosion resistance) suitable for lubrication of various mechanisms incorporated in apparatuses has been desired.

Solution to Problem

The present invention provides, in one embodiment, a lubricating oil composition comprising a base oil, a phosphorous acid ester having at least one prescribed sulfur atom-containing group, a thiadiazole-based compound in a prescribed amount, and a benzotriazole-based compound in a prescribed amount. Specifically, the present invention provides lubricating oil compositions according to the following embodiments [1], [1a], [1b], and [2] to [10], an electrically driven unit according to the following embodiment [11], and a method for using a lubricating oil composition according to the following embodiment [12].

[1]

A lubricating oil composition comprising a base oil (A), a phosphorous acid ester (B) having at least one sulfur atom-containing group having 2 to 20 carbon atoms, the sulfur atom-containing group having at least one —$(S)_x$— group (x is an integer of 1 or more) between two adjacent carbon atoms in a structure of an alkyl group, a thiadiazole-based compound (C), and a benzotriazole-based compound (D), wherein a content of the component (C) is 0.01 mass % or more and less than 0.60 mass % based on the total amount of the lubricating oil composition, and a content of the component (D) is 0.02 mass % or more and less than 0.20 mass % based on the total amount of the lubricating oil composition.

[1a]

A lubricating oil composition comprising:

a base oil (A), one or more phosphorous acid esters (B) selected from a compound (B1) represented by the following general formula (b-1) and a compound (B2) represented by the following general formula (b-2):

(b-1)

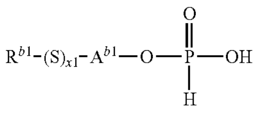

(b-2)

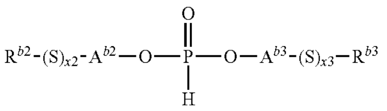

wherein $R^{b1}$, $R^{b2}$, and $R^{b3}$ are each independently a straight-chain or branched chain alkyl group, $A^{b1}$, $A^{b2}$, and $A^{b3}$ are each independently a straight-chain or branched chain alkylene group, the total number of carbon atoms of $R^{b1}$ and $A^{b1}$, the total number of carbon atoms of $R^{b2}$ and $A^{b2}$, and the total number of carbon atoms of $R^{b3}$ and $A^{b3}$ are each independently 2 to 20, and x1, x2, and x3 are each independently an integer of 1 or more, a thiadiazole-based compound (C) comprising a compound represented by any of the following general formulae (c-1) to (c-4):

(c-1)

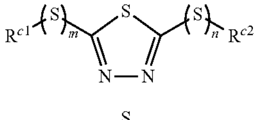

(c-2)

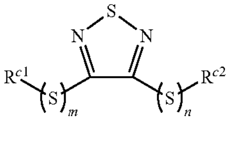

(c-3)

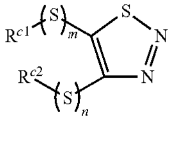

-continued (c-4)

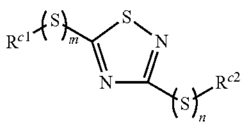

wherein $R^{c1}$ and $R^{c2}$ are each independently a hydrocarbon group, and m and n are each independently an integer of 1 to 10, and a benzotriazole-based compound (D) comprising a compound represented by the following general formula (d-0):

(d-0)

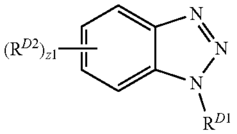

wherein $R^{D1}$ is a hydrocarbon group optionally containing at least one atom selected from the group consisting of an oxygen atom, a sulfur atom, and a nitrogen atom, or a hydrogen atom, each $R^{D2}$ is independently a hydrocarbon group optionally containing at least one atom selected from the group consisting of an oxygen atom, a sulfur atom, and a nitrogen atom, and z1 is an integer of 0 to 4, wherein a content of the component (C) is 0.01 mass % or more and less than 0.60 mass % based on the total amount of the lubricating oil composition, and a content of the component (D) is 0.02 mass % or more and less than 0.20 mass % based on the total amount of the lubricating oil composition.

[1b]

A lubricating oil composition comprising:

a base oil (A), one or more phosphorous acid esters (B) selected from a compound (B11) represented by the following general formula (b-11) and a compound (B21) represented by the following general formula (b-21):

(b-11)

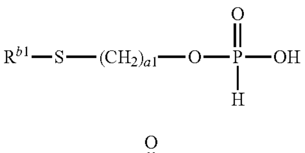

(b-21)

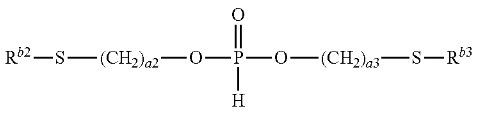

wherein $R^{b1}$, $R^{b2}$, and $R^{b3}$ are each independently a straight-chain or branched chain alkyl group, a1, a2, and a3 are each independently an integer of 1 to 19, the total number of carbon atoms of $R^{b1}$ and a1, the total number of carbon atoms of $R^{b2}$ and a2, and the total number of carbon atoms of $R^{b3}$ and a3 are each independently 2 to 20, a thiadiazole-based compound (C) comprising a compound represented by any of the following general formulae (c-1) to (c-4):

(c-1)

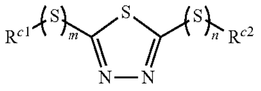

(c-2)

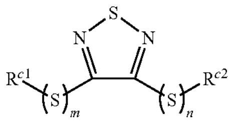

(c-3)

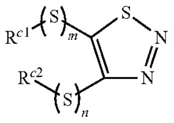

(c-4)

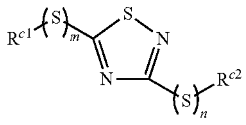

wherein $R^{c1}$ and $R^{c2}$ are each independently a branched chain alkyl group having 5 or more carbon atoms, and m and n are each independently an integer of 1 to 10, and a benzotriazole-based compound (D) comprising a compound represented by the following general formula (d-1):

(d-1)

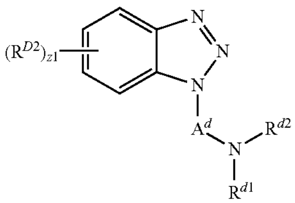

wherein $A^d$ is a divalent hydrocarbon group, $R^{d1}$ and $R^{d2}$ are each independently a monovalent hydrocarbon group, each $R^{D2}$ is independently a hydrocarbon group optionally containing at least one atom selected from the group consisting of an oxygen atom, a sulfur atom, and a nitrogen atom, and z1 is an integer of 0 to 4, wherein a content of the component (C) is 0.01 mass % or more and less than 0.60 mass % based on the total amount of the lubricating oil composition, and a content of the component (D) is 0.02 mass % or more and less than 0.20 mass % based on the total amount of the lubricating oil composition.

[2]

The lubricating oil composition according to the above [1], wherein the sulfur atom-containing group is a group represented by the following general formula (b-i):

$$R^b\text{—}(S)_x\text{-}A^b\text{-}* \qquad \text{(b-i)}$$

wherein $R^b$ is a straight-chain or branched chain alkyl group, $A^b$ is a straight-chain or branched chain alkylene group, the total number of carbon atoms of $R^b$ and $A^b$ is 2 to 20, x is an integer of 1 or more, and * represents a bonding position.

[3]

The lubricating oil composition according to any one of the above [1], [1a], [1b], and [2], wherein a content of the component (B) is 0.01 to 2.00 mass % based on the total amount of the lubricating oil composition.

[4]

The lubricating oil composition according to any one of the above [1], [1a], [1b], and [2] to [3], wherein a content ratio [(D)/(C)] by mass of the component (D) to the component (C) is 0.05 to 0.60.

[5]

The lubricating oil composition according to any one of the above [1], [1a], [1b], and [2] to [4], wherein a content ratio [(D)/(B)] by mass of the component (D) to the component (B) is 0.05 to 0.60.

[6]

The lubricating oil composition according to any one of the above [1], [1a], [1b], and [2] to [5], wherein a content of a sulfur atom-free phosphorous acid ester is less than 0.10 mass % based on the total amount of the lubricating oil composition.

[7]

The lubricating oil composition according to any one of the above [1], [1a], [1b], and [2] to [6], wherein a content of a sulfur atom-free phosphoric acid ester is less than 0.10 mass % based on the total amount of the lubricating oil composition.

[8]

The lubricating oil composition according to any one of the above [1], [1a], [1b], and [2] to [7], wherein a content of a monoester-based base oil is less than 3.0 mass % based on the total amount of the component (A) contained in the lubricating oil composition.

[9]

The lubricating oil composition according to any one of the above [1], [1a], [1b], and [2] to [8], wherein a kinematic viscosity of the lubricating oil composition at 100° C. is 4.0 $mm^2/s$ or less.

[10]

The lubricating oil composition according to any one of the above [1], [1a], [1b], and [2] to [9], being used for an electrically driven unit comprising at least a gearbox and an electric motor.

[11]

An electrically driven unit filled with the lubricating oil composition according to any one of the above [1], [1a], [1b], and [2] to [10], and comprising at least a gearbox and an electric motor.

[12]

A method for using a lubricating oil composition, wherein the lubricating oil composition according to any one of the above [1], [1a], [1b], and [2] to [10] is applied to an electrically driven unit comprising at least a gearbox and an electric motor.

Advantageous Effects of Invention

The lubricating oil composition of one preferred embodiment of the present invention is a lubricating oil composition having characteristics suitable for lubrication of various mechanisms incorporated in apparatuses, and the lubricating oil composition of a more specific embodiment of the present invention can be improved in scuffing resistance and copper corrosion resistance in a balanced manner. On that account, these lubricating oil compositions can be preferably used for lubrication of, for example, an electrically driven unit including at least a gearbox and an electric motor.

DESCRIPTION OF EMBODIMENTS

Regarding the numerical range described in the present specification, the upper limit and the lower limit can be arbitrarily combined. For example, with the description "preferably 30 to 100, more preferably 40 to 80" as a numerical range, the range of "30 to 80" and the range of "40 to 100" are also included in the numerical range described in the present specification. Alternatively, for example, with the description "preferably 30 or more, more preferably 40 or more, and preferably 100 or less, more preferably 80 or less" as a numerical range, the range of "30 to 80" and the range of "40 to 100" are also included in the numerical range described in the present specification.

In addition, for example, the description of "60 to 100" as the numerical range described in the present specification means a range of "60 or more (60 or more than 60) and 100 or less (100 or less than 100)".

The numerical range of a lower limit to an upper limit can be defined by appropriately selecting values from among respective options and optionally combining them in the definition of the upper limit and the lower limit described in the present specification.

Additionally, multiple requirements among various requirements described as preferred embodiments described in the present specification can be combined.

In the present specification, the kinematic viscosity and the viscosity index mean values measured or calculated in accordance with JIS K2283:2000.

The content of phosphorus atoms (P) means a value measured in accordance with JPI-5S-38-92.

The content of nitrogen atoms (N) means a value measured in accordance with JIS K2609:1998.

The content of sulfur atoms (S) means a value measured in accordance with JIS K2541-6:2013.

[Constitution of Lubricating Oil Composition]

The lubricating oil composition of one embodiment of the present invention comprises a base oil (A) (also referred to as a "component (A)" hereinafter), a phosphorous acid ester (B) (also referred to as a "component (B)" hereinafter), a thiadiazole-based compound (C) (also referred to as a "component (C)" hereinafter), and a benzotriazole-based compound (D) (also referred to as a "component (D)" hereinafter).

The lubricating oil composition of one embodiment of the present invention can become a lubricating oil composition having characteristics suitable for lubrication of various mechanisms by containing the components (A) to (D), and as a more specific embodiment, the lubricating oil composition can become a lubricating oil composition having been improved in scuffing resistance and copper corrosion resistance in a balanced manner. In the lubricating oil composition of one embodiment of the present invention, the component (B) and the component (C) contribute to improvement in scuffing resistance, and the component (D) contributes to improvement in copper corrosion resistance.

Since the lubricating oil composition of one embodiment of the present invention has such characteristics, it can be preferably used for lubrication of, for example, an electrically driven unit including at least a gearbox and an electric motor.

For example, in an electrically driven unit, a gearbox and an electric motor are integrated, and the lubricating oil composition used for lubrication of a gear also comes into contact with the electric motor and can be utilized for cooling the electric motor. However, the electric motor is often constituted of a member formed of a copper plate, and corrosion of the copper plate caused by the lubricating oil composition sometimes becomes a problem. The problem of corrosion of the copper plate caused by the lubricating oil composition can occur not only in a place that is in direct contact with the lubricating oil composition (also referred to as a "liquid phase portion" hereinafter) but also in a place that is not in direct contact with the lubricating oil composition (also referred to as a "vapor phase portion" hereinafter). Corrosion of the copper plate in the vapor phase portion is thought to be attributable to a vaporized lubricating oil composition, and the copper corrosion resistance is required not only in the liquid phase portion but also in the vapor phase portion.

In dealing with such a problem, the contents of the component (C) and the component (D) are adjusted in the lubricating oil composition of one embodiment of the present invention, and thereby, the copper corrosion resistance in both the liquid phase portion and the vapor phase portion has been also improved, together with the scuffing resistance, in a balanced manner.

The lubricating oil composition of one embodiment of the present invention may further contain additives other than the components (B) to (D) when needed as long as the effects of the present invention are not impaired.

In the lubricating oil composition of one embodiment of the present invention, the total content of the components (A) to (D) is preferably 50 mass % or more, more preferably 60 mass % or more, more preferably 70 mass % or more, still more preferably 75 mass % or more, still more preferably 80 mass % or more, still much more preferably 85 mass % or more, and particularly preferably 90 mass % or more, and it may be 100 mass % or less, 99.5 mass % or less, 99.0 mass % or less, 98.0 mass % or less, 97.0 mass % or less, 96.0 mass % or less, or 95.0 mass % or less, based on the total amount (100 mass %) of the lubricating oil composition.

Details of the components contained in the lubricating oil composition of one embodiment of the present invention will be described hereinafter.

<Component (A): Base Oil>

As the base oil that is the component (A) used in one embodiment of the present invention, one or more selected from mineral oils and synthetic oils can be mentioned.

Examples of the mineral oils include atmospheric residues obtained by subjecting crude oils, such as paraffinic crude oil, intermediate base crude oil, and naphthenic crude oil, to atmospheric distillation; distillates obtained by subjecting these atmospheric residues to vacuum distillation; refined oils obtained by subjecting the distillates to one or more of refining treatments, such as solvent deasphalting, solvent extraction, hydrocracking, solvent dewaxing, catalytic dewaxing, and hydrorefining (hydrocracking); and mineral oils (GTL) obtained by isomerizing GTL wax (Gas To Liquids WAX) produced from natural gas through Fischer-Tropsch process or the like.

Examples of the synthetic oils include poly-α-olefins, such as an α-olefin homopolymer and an α-olefin copolymer (for example, an α-olefin copolymer having 8 to 14 carbon atoms such as an ethylene-α-olefin copolymer); isoparaffin; polyalkylene glycol; ester oils other than monoesters, such as polyol ester, dibasic acid ester, and phosphoric acid ester; ether oils, such as polyphenyl ether; alkylbenzene; and alkylnaphthalene.

The component (A) used in one embodiment of the present invention preferably contains one or more selected from mineral oils classified in Group II and Group III of API (American Petroleum Institute) base oil categories, and synthetic oils.

From the viewpoint of obtaining a lubricating oil composition capable of reducing seizure on a sliding member, the kinematic viscosity of the component (A) used in one embodiment of the present invention at 100° C. is preferably 2.0 $mm^2/s$ or more, more preferably 2.2 $mm^2/s$ or more, still more preferably 2.3 $mm^2/s$ or more, still much more preferably 2.5 $mm^2/s$ or more, and particularly preferably 2.6 $mm^2/s$ or more, and from the viewpoint of obtaining a lubricating oil composition having excellent cooling properties, it is preferably 6.0 $mm^2/s$ or less, more preferably 5.5 $mm^2/s$ or less, more preferably 5.0 $mm^2/s$ or less, still more preferably 4.7 $mm^2/s$ or less, still more preferably 4.5 $mm^2/s$ or less, still much more preferably 4.2 $mm^2/s$ or less, and particularly preferably 4.0 $mm^2/s$ or less.

The viscosity index of the component (A) used in one embodiment of the present invention is preferably 70 or more, more preferably 80 or more, still more preferably 90 or more, still much more preferably 100 or more, and particularly preferably 105 or more.

When a mixed oil that is a combination of two or more base oils is used as the component (A) in one embodiment of the present invention, the kinematic viscosity and the viscosity index of the mixed oil are preferably in the above ranges. On that account, by using a low-viscosity base oil and a high-viscosity base oil in combination, the mixed oil may be prepared so as to have a kinematic viscosity and a viscosity index in the above ranges.

The mixed oil may be a mixed oil of a combination of two or more base oils each having a kinematic viscosity at 100° C. and a viscosity index belonging to the aforementioned ranges, or may be a mixed oil of a combination of a base oil having a kinematic viscosity at 100° C. and a viscosity index belonging to the aforementioned ranges and a base oil having those not belonging to the aforementioned ranges. Alternatively, the mixed oil may be a mixed oil obtained by combining a low-viscosity base oil having a kinematic viscosity at 100° C. and a viscosity index not belonging to the aforementioned ranges and a high-viscosity base oil to adjust them so that they will belong to the aforementioned ranges. Moreover, when a mixed oil of a combination of two or more base oils is used, a weighted average of a kinematic viscosity or a viscosity index of the mixed oil, which is calculated by multiplying a kinematic viscosity or a viscosity index of each base oil for constituting the mixed oil by a content ratio, preferably belongs to the aforementioned range.

In the lubricating oil composition of one embodiment of the present invention, the content of the component (A) is preferably 30 mass % or more, more preferably 40 mass % or more, more preferably 50 mass % or more, still more preferably 60 mass % or more, still more preferably 70 mass % or more, still much more preferably 80 mass % or more, and particularly preferably 90 mass % or more, and it may be 99.9 mass % or less, 99.5 mass % or less, 99.0 mass % or less, 98.5 mass % or less, or 98.0 mass % or less, based on the total amount (100 mass %) of the lubricating oil composition.

In the lubricating oil composition of one embodiment of the present invention, a monoester-based base oil may be contained as the component (A), or a monoester-based base oil may not be contained.

The content of the monoester-based base oil may be less than 3.0 mass %, less than 2.5 mass %, less than 2.0 mass %, less than 1.5 mass %, less than 1.0 mass %, less than 0.5 mass %, less than 0.1 mass %, less than 0.05 mass %, less than 0.01 mass %, or less than 0.001 mass %, based on the total amount of the component (A) contained in the lubricating oil composition.

The monoester-based base oil means a base oil composed of an ester of a monohydric alcohol and a monobasic acid. Examples of the monohydric alcohols include alcohols having 1 to 24 carbon atoms, such as methanol, ethanol, propanol, butanol, pentanol, and hexanol. Examples of the monobasic acids include fatty acids having 2 to 24 carbon atoms, such as acetic acid, propionic acid, butanoic acid, pentanoic acid, and hexanoic acid.

<Component (B): Phosphorous Acid Ester>

The lubricating oil composition of one embodiment of the present invention contains, as the component (B), a phosphorous acid ester having at least one sulfur atom-containing group having 2 to 20 carbon atoms, the sulfur atom-containing group having at least one —$(S)_x$— group (x is an integer of 1 or more, but it is preferably an integer of 1 to 10, more preferably an integer of 1 to 5, still more preferably an integer of 1 to 3, still much more preferably 1 or 2, particularly preferably 1) between two adjacent carbon atoms in a structure of an alkyl group.

A lubricating oil composition having been improved in scuffing resistance can be obtained by containing the component (B).

In one embodiment of the present invention, the component (B) may be used singly, or may be used in combination of two or more.

The number of the sulfur atom-containing groups of the phosphorous acid ester of the component (B) is at least one, but from the viewpoint of obtaining a lubricating oil composition having been more improved in scuffing resistance, it is preferably one or two, and more preferably one.

From the above viewpoint, the sulfur atom-containing group of the phosphorous acid ester of the component (B) is preferably a group represented by the following general formula (b-i).

$R^b$—$(S)_x$-$A^b$-* (b-i)

In the general formula (b-i), $R^b$ is a straight-chain or branched chain alkyl group, $A^b$ is a straight-chain or branched chain alkylene group, the total number of carbon atoms of $R^b$ and $A^b$ is 2 to 20, x is an integer of 1 or more, and * represents a bonding position.

The total number of carbon atoms of $R^b$ and $A^b$ is 2 to 20, but from the viewpoint of obtaining a lubricating oil composition having been more improved in scuffing resistance, it is preferably 3 to 18, more preferably 4 to 16, still more preferably 5 to 14, and still much more preferably 6 to 12.

x is an integer of 1 or more, but it is preferably an integer of 1 to 10, more preferably an integer of 1 to 5, still more preferably an integer of 1 to 3, still much more preferably 1 or 2, and particularly preferably 1.

The number of carbon atoms of the alkyl group capable of being selected as $R^b$ is preferably 1 to 19, more preferably 1 to 16, still more preferably 3 to 14, still much more preferably 4 to 12, and particularly preferably 6 to 10.

Examples of the alkyl groups capable of being selected as $R^b$ include a methyl group, an ethyl group, a propyl group (n-propyl group, isopropyl group), a butyl group (n-butyl group, s-butyl group, t-butyl group, isobutyl group), a pentyl group, a hexyl group, a 2-ethylhexyl group, a heptyl group, an octyl group, a nonyl group, a decyl group, an undecyl group, a dodecyl group, tridecyl group, a tetradecyl group, a hexadecyl group, and an octadecyl group.

The number of carbon atoms of the alkylene group capable of being selected as $A^b$ is preferably 1 to 19, more preferably 1 to 16, more preferably 1 to 12, still more preferably 1 to 10, still more preferably 1 to 8, still much more preferably 1 to 6, and particularly preferably 2 to 4.

Examples of the alkylene groups capable of being selected as $A^b$ include a methylene group, a 1,1-ethylene group, a 1,2-ethylene group, various propylene groups, such as 1,3-propylene, 1,2-propylene, and 2,2-propylene, various butylene groups, various pentylene groups, various hexylene groups, various heptylene groups, various octylene groups, various nonylene groups, various decylene groups, various undecylene groups, various dodecylene groups, various tridecylene groups, various tetradecylene groups, various pentadecylene groups, various hexadecylene groups, various heptadecylene groups, and various octadecylene groups.

The alkylene group capable of being selected as $A^b$ is preferably a group represented by —$(CH_2)_n$— (n is an integer of 1 to 19, preferably an integer of 1 to 16, more preferably an integer of 1 to 12, still more preferably an integer of 1 to 10, still more preferably an integer of 1 to 8, still much more preferably an integer of 1 to 6, particularly preferably an integer of 1 to 4) among these.

The phosphorous acid ester used as the component (B) in one embodiment of the present invention is preferably one or more selected from a compound (B1) represented by the following general formula (b-1) (also referred to as a "component (B1)" hereinafter) and a compound (B2) represented by the following general formula (b-2) (also referred to as a "component (B2)" hereinafter), and is more preferably one or more selected from a compound (B11) represented by the following general formula (b-11) (also referred to as a "component (B11)" hereinafter) and a compound (B21) represented by the following general formula (b-21) (also referred to as a "component (B21)" hereinafter).

(b-1)

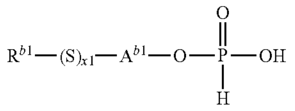

(b-2)

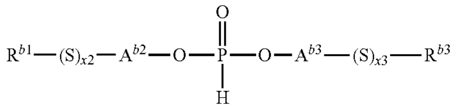

(b-11)

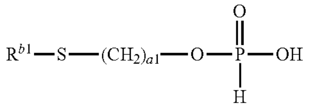

(b-21)

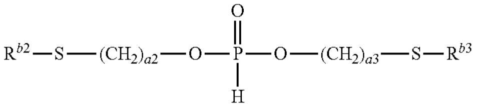

In the formulae (b-1), (b-2), (b-11), and (b-21), $R^{b1}$, $R^{b2}$, and $R^{b3}$ are each independently a straight-chain or branched chain alkyl group.

The alkyl group capable of being selected as $R^{b1}$, $R^{b2}$, and $R^{b3}$ is the same as the alkyl group capable of being selected as $R^b$ in the aforementioned general formula (b-i), and a preferred number of carbon atoms and specific groups are also the same.

In the formulae (b-1) and (b-2), $A^{b1}$, $A^{b2}$, and $A^{b3}$ are each independently a straight-chain or branched chain alkylene group.

The total number of carbon atoms of $R^{b1}$ and $A^{b1}$, the total number of carbon atoms of $R^{b2}$ and $A^{b2}$, and the total number of carbon atoms of $R^{b3}$ and $A^{b3}$ are each independently 2 to 20, preferably 3 to 18, more preferably 4 to 16, still more preferably 5 to 14, and still much more preferably 6 to 12.

x1, x2, and x3 are each independently an integer of 1 or more, but it is preferably an integer of 1 to 10, more preferably an integer of 1 to 5, still more preferably an integer of 1 to 3, still much more preferably 1 or 2, and particularly preferably 1.

The alkylene group capable of being selected as $A^{b1}$, $A^{b2}$, and $A^{b3}$ is the same as the alkylene group capable of being selected as $A^b$ in the aforementioned general formula (b-i), and a preferred number of carbon atoms and specific groups are also the same.

In the formulae (b-11) and (b-21), a1, a2, and a3 are each independently an integer of 1 to 19, preferably an integer of 1 to 16, more preferably an integer of 1 to 12, more preferably an integer of 1 to 10, still more preferably an integer of 1 to 8, still much more preferably an integer of 1 to 6, and particularly preferably an integer of 2 to 4.

The total number of carbon atoms of $R^{b1}$ and a1, the total number of carbon atoms of $R^{b2}$ and a2, and the total number of carbon atoms of $R^{b3}$ and a3 are each independently 2 to 20, preferably 3 to 18, more preferably 4 to 16, still more preferably 5 to 14, and still much more preferably 6 to 12.

From the viewpoint of obtaining a lubricating oil composition having a good balance among various characteristics such as scuffing resistance and copper corrosion resistance, the component (B) used in one embodiment of the present invention preferably contains both the component (B1) and the component (B2), and more preferably contains both the component (B11) and the component (B12).

In the lubricating oil composition of one embodiment of the present invention, the content ratio [(B1)/(B2)] by mass of the component (B1) to the component (B2) and the content ratio [(B11)/(B21)] by mass of the component (B11) to the component (B21) are each preferably 1/10 or more, 1/7 or more, 1/5 or more, 1/4 or more, 1/3 or more, 1/2 or more, 1/1 or more, 2/1 or more, 3/1 or more, 4/1 or more, 5/1 or more, 6/1 or more, or 7/1 or more, and are each preferably 20/1 or less, 18/1 or less, 16/1 or less, 14/1 or less, 12/1 or less, or 10/1 or less.

The phosphorous acid ester used as the component (B) in one embodiment of the present invention may be in the form of an amine salt, or may not be in the form of an amine salt.

The amine to form an amine salt is preferably a compound represented by the following general formula (b-3). The amine may be used singly, or may be used in combination of two or more.

$$(R^x)_r\text{—N—}(H)_{3-r} \qquad \text{(b-3)}$$

In the general formula (b-3), r is an integer of 1 to 3, and is preferably 1.

Each $R^x$ is independently an alkyl group having 6 to 18 carbon atoms, an alkenyl group having 6 to 18 carbon atoms, an aryl group having 6 to 18 carbon atoms, or a hydroxyalkyl group having 6 to 18 carbon atoms.

When multiple $R^x$ are present, the multiple $R^x$ may be the same as one another, or may be different from one another.

From the viewpoint of obtaining a lubricating oil composition having been more improved in scuffing resistance, the content of the component (B) in the lubricating oil composition of one embodiment of the present invention is preferably 0.01 mass % or more, more preferably 0.05 mass % or more, more preferably 0.07 mass % or more, still more preferably 0.10 mass % or more, still more preferably 0.15 mass % or more, still much more preferably 0.20 mass % or more, and particularly preferably 0.25 mass % or more, and from the viewpoint of obtaining a lubricating oil composition having a good balance among various characteristics such as scuffing resistance and copper corrosion resistance, it is preferably 2.00 mass % or less, more preferably 1.70 mass % or less, more preferably 1.50 mass % or less, still more preferably 1.20 mass % or less, still more preferably 1.00 mass % or less, still much more preferably 0.80 mass % or less, and particularly preferably 0.70 mass % or less, based on the total amount (100 mass %) of the lubricating oil composition.

From the above viewpoint, the content of the component (B) in terms of phosphorus atoms in the lubricating oil composition of one embodiment of the present invention is preferably 20 ppm by mass or more, more preferably 50 ppm by mass or more, more preferably 100 ppm by mass or more, still more preferably 120 ppm by mass or more, still more preferably 150 ppm by mass or more, still much more preferably 170 ppm by mass or more, and particularly preferably 200 ppm by mass or more, and is preferably 800 ppm by mass or less, more preferably 700 ppm by mass or less, still more preferably 600 ppm by mass or less, still much more preferably 500 ppm by mass or less, and particularly preferably 400 ppm by mass or less, based on the total amount (100 mass %) of the lubricating oil composition.

From the above viewpoint, the content of the component (B) in terms of sulfur atoms in the lubricating oil composition of one embodiment of the present invention is preferably 10 ppm by mass or more, more preferably 50 ppm by mass or more, more preferably 100 ppm by mass or more, still more preferably 150 ppm by mass or more, still more preferably 170 ppm by mass or more, still much more preferably 200 ppm by mass or more, and particularly preferably 230 ppm by mass or more, and is preferably 800 ppm by mass or less, more preferably 700 ppm by mass or less, still more preferably 600 ppm by mass or less, still much more preferably 500 ppm by mass or less, and particularly preferably 400 ppm by mass or less, based on the total amount (100 mass %) of the lubricating oil composition.

<Sulfur Atom-Free Phosphorous Acid Ester>

The lubricating oil composition of one embodiment of the present invention may further contain a sulfur atom-free phosphorous acid ester as long as the effects of the present invention are not impaired, or may not contain a sulfur atom-free phosphorous acid ester.

The sulfur atom-free phosphorous acid ester is, for example, an acidic phosphorous acid ester represented by the following formula (b'-1) or (b'-2).

(b'-1)

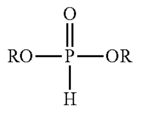

(b'-2)

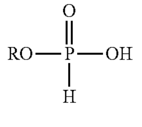

In the above formulae, each R is independently an alkyl group having 1 to 30 carbon atoms, an alkenyl group having 2 to 20 carbon atoms, or an aryl group having 6 to 18 carbon atoms which may be substituted by an alkyl group having 1 to 6 carbon atoms. Multiple R may be the same as each other, or may be different from each other.

From the viewpoint of obtaining a lubricating oil composition having better copper corrosion resistance, the content of the sulfur atom-free phosphorous acid ester in the lubricating oil composition of one embodiment of the present invention is preferably less than 0.10 mass %, less than 0.05 mass %, less than 0.01 mass %, less than 0.005 mass %, less than 0.001 mass %, or less than 0.0001 mass %, based on the total amount (100 mass %) of the lubricating oil composition.

From the viewpoint of obtaining a lubricating oil composition having better copper corrosion resistance, the content of the sulfur atom-free phosphorous acid ester in the lubricating oil composition of one embodiment of the present invention is preferably 0 to 10 parts by mass, 0 to 5 parts by mass, 0 to 1 part by mass, 0 to 0.1 part by mass, 0 to 0.01 part by mass, or 0 to 0.001 part by mass, based on the total amount 100 parts by mass of the component (B) contained in the lubricating oil composition.

<Sulfur Atom-Free Phosphoric Acid Ester>

The lubricating oil composition of one embodiment of the present invention may further contain a sulfur atom-free phosphoric acid ester as long as the effects of the present invention are not impaired, or may not contain a sulfur atom-free phosphoric acid ester.

Examples of the sulfur atom-free phosphoric acid esters include a neutral phosphoric acid ester represented by the following general formula (b'-3) and an acidic phosphoric acid ester represented by the following general formula (b'-4) or (b'-5).

(b'-3)

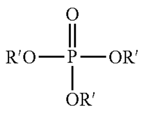

(b'-4)

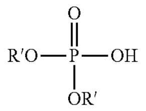

(b'-5)

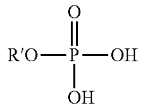

In the above formulae, each R' is independently an alkyl group having 1 to 30 carbon atoms, an alkenyl group having 2 to 20 carbon atoms, or an aryl group having 6 to 18 carbon atoms which may be substituted by an alkyl group having 1 to 6 carbon atoms. Multiple R' may be the same as one another, or may be different from one another.

From the viewpoint of obtaining a lubricating oil composition having better copper corrosion resistance, the content of the sulfur atom-free phosphoric acid ester in the lubricating oil composition of one embodiment of the present invention is preferably less than 0.10 mass %, less than 0.05 mass %, less than 0.01 mass %, less than 0.005 mass %, less than 0.001 mass %, or less than 0.0001 mass %, based on the total amount (100 mass %) of the lubricating oil composition.

From the viewpoint of obtaining a lubricating oil composition having better copper corrosion resistance, the content of the sulfur atom-free phosphoric acid ester in the lubricating oil composition of one embodiment of the present invention is preferably 0 to 10 parts by mass, 0 to 5 parts by mass, 0 to 1 part by mass, 0 to 0.1 part by mass, 0 to 0.01 part by mass, or 0 to 0.001 part by mass, based on the total amount 100 parts by mass of the component (B) contained in the lubricating oil composition.

<Component (C): Thiadiazole-Based Compound>

The lubricating oil composition of one embodiment of the present invention can become a lubricating oil composition having been improved in scuffing resistance by containing a thiadiazole-based compound as the compound (C). The scuffing resistance improving effect of the component (C) can be more effectively exhibited even in a lubricating oil composition whose viscosity has been lowered.

The component (C) may be used singly, or may be used in combination of two or more.

From the viewpoint of obtaining a lubricating oil composition having been improved in scuffing resistance, the content of the component (C) in the lubricating oil composition of one embodiment of the present invention is 0.01 mass % or more based on the total amount (100 mass %) of the lubricating oil composition. If the content of the component (C) is less than 0.01 mass %, the scuffing resistance is not sufficiently improved.

On the other hand, the component (C) also causes increase in elution amount of copper. Particularly when part of a member composed of a copper plate is brought into contact with a lubricating oil composition, not only does corrosion in a liquid phase portion where the copper plate is in direct contact with the lubricating oil composition become a problem, but also corrosion in a vapor phase portion where the copper plate is not in direct contact with the lubricating oil composition but the corrosion is attributable to a vaporized lubricating oil composition frequently becomes a problem.

In order to solve such a problem, the content of the component (C) in the lubricating oil composition of one embodiment of the present invention is adjusted to less than 0.60 mass % based on the total amount (100 mass %) of the lubricating oil composition, and thereby, copper corrosion resistance in both the liquid phase portion and the vapor phase portion is also improved together with the scuffing resistance, in a balanced manner. If the content of the component (C) is 0.60 mass % or more, it becomes difficult to improve scuffing resistance and copper corrosion resistance in a balanced manner.

From the viewpoint of obtaining a lubricating oil composition having been more improved in scuffing resistance, the content of the component (C) in the lubricating oil composition of one embodiment of the present invention is preferably 0.03 mass % or more, more preferably 0.05 mass % or more, more preferably 0.07 mass % or more, more preferably 0.10 mass % or more, still more preferably 0.12 mass % or more, still more preferably 0.15 mass % or more, still more preferably 0.17 mass % or more, still much more preferably 0.20 mass % or more, and particularly preferably 0.22 mass % or more, or may be 0.23 mass % or more, 0.24 mass % or more, 0.25 mass % or more, 0.26 mass % or more, 0.27 mass % or more, or 0.28 mass % or more, based on the total amount (100 mass %) of the lubricating oil composition.

From the viewpoint of obtaining a lubricating oil composition having been improved also in copper corrosion resistance in both the liquid phase portion and the vapor phase portion together with scuffing resistance in a more balanced manner, the content of the component (C) in the lubricating oil composition of one embodiment of the present invention is preferably 0.57 mass % or less, more preferably 0.55 mass % or less, more preferably 0.52 mass % or less, more preferably 0.50 mass % or less, still more preferably 0.47 mass % or less, still more preferably 0.45 mass % or less, still more preferably 0.42 mass % or less, still much more preferably 0.40 mass % or less, and particularly preferably 0.38 mass % or less, based on the total amount (100 mass %) of the lubricating oil composition.

From the viewpoint of obtaining a lubricating oil composition having been more improved in scuffing resistance, the content of the component (C) in terms of sulfur atoms in the lubricating oil composition of one embodiment of the present invention is preferably 50 ppm by mass or more, more preferably 100 ppm by mass or more, more preferably 200 ppm by mass or more, more preferably 300 ppm by mass or more, still more preferably 350 ppm by mass or more, still more preferably 400 ppm by mass or more, still more preferably 500 ppm by mass or more, still much more preferably 600 ppm by mass or more, and particularly preferably 700 ppm by mass or more, and from the viewpoint of obtaining a lubricating oil composition having been improved also in copper corrosion resistance in both the liquid phase portion and the vapor phase portion together with scuffing resistance in a more balanced manner, it is preferably 2500 ppm by mass or less, more preferably 2000 ppm by mass or less, more preferably 1800 ppm by mass or less, more preferably 1600 ppm by mass or less, still more preferably 1500 ppm by mass or less, still more preferably 1400 ppm by mass or less, still more preferably 1300 ppm by mass or less, still much more preferably 1200 ppm by mass or less, and particularly preferably 1100 ppm by mass or less, based on the total amount (100 mass %) of the lubricating oil composition.

From the viewpoint of obtaining a lubricating oil composition having been more improved in scuffing resistance, the content of the component (C) in terms of nitrogen atoms in the lubricating oil composition of one embodiment of the present invention is preferably 10 ppm by mass or more, more preferably 30 ppm by mass or more, more preferably 50 ppm by mass or more, more preferably 60 ppm by mass or more, still more preferably 70 ppm by mass or more, still more preferably 80 ppm by mass or more, still more preferably 90 ppm by mass or more, still much more preferably 100 ppm by mass or more, and particularly preferably 120 ppm by mass or more, and from the viewpoint of obtaining a lubricating oil composition having been improved also in copper corrosion resistance in both the liquid phase portion and the vapor phase portion together with scuffing resistance in a more balanced manner, it is preferably 500 ppm by mass or less, more preferably 450 ppm by mass or less, more preferably 400 ppm by mass or less, more preferably 350 ppm by mass or less, still more preferably 300 ppm by mass or less, still more preferably 280 ppm by mass or less, still more preferably 270 ppm by mass or less, still much more preferably 250 ppm by mass or less, and particularly preferably 230 ppm by mass or less, based on the total amount (100 mass %) of the lubricating oil composition.

The thiadiazole-based compound that is the component (C) used in one embodiment of the present invention may be any compound as long as it is a compound having a thiadiazole ring, but from the viewpoint of obtaining a lubricating oil composition having been more improved in scuffing resistance, it preferably contains a compound represented by any one of the following general formulae (c-1) to (c-4), and more preferably contains at least a compound represented by the following general formula (c-1).

(c-1)

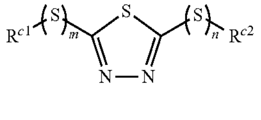

-continued (c-2)

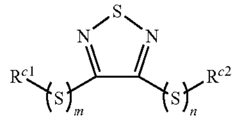

(c-3)

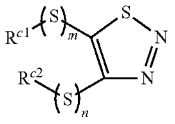

(c-4)

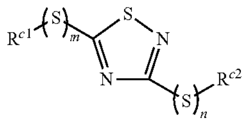

In the above formulae, $R^{c1}$ and $R^{c2}$ are each independently a hydrocarbon group.

m and n are each independently an integer of 1 to 10, but from the viewpoint of obtaining a lubricating oil composition having been more improved in scuffing resistance, they are each independently preferably an integer of 1 to 6, more preferably an integer of 1 to 4, still more preferably an integer of 2 to 3, and still much more preferably 2.

Examples of the hydrocarbon groups capable of being selected as $R^{c1}$ and $R^{c2}$ include straight-chain or branched chain alkyl groups, such as a methyl group, an ethyl group, a propyl group (n-propyl group, isopropyl group), a butyl group (n-butyl group, s-butyl group, t-butyl group, isobutyl group), a pentyl group, a hexyl group, a heptyl group, an octyl group, a 2-ethylhexyl group, a nonyl group, a 1,1-dimethylheptyl group, a decyl group, an undecyl group, a dodecyl group, a tridecyl group, a tetradecyl group, a pentadecyl group, a hexadecyl group, a heptadecyl group and an octadecyl group; straight-chain or branched chain alkenyl groups, such as an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group and a pentadecenyl group; cycloalkyl groups which may have an alkyl group, such as a cyclohexyl group, a dimethylcyclohexyl group, an ethylcyclohexyl group, a propylcyclohexyl group, a butylcyclohexyl group and a heptylcyclohexyl group; aryl groups, such as a phenyl group, a naphthyl group, an anthracenyl group, a biphenyl group and a terphenyl group; alkylaryl groups, such as a tolyl group, a dimethylphenyl group, a butylphenyl group, a nonylphenyl group, a methylbenzyl group, and a dimethylnaphthyl group; and arylalkyl groups, such as a phenylmethyl group, a phenylethyl group and a diphenylmethyl group.

From the viewpoint of obtaining a lubricating oil composition having been more improved in scuffing resistance, the number of carbon atoms of the hydrocarbon group capable of being selected as $R^{c1}$ and $R^{c2}$ is preferably 1 or more, more preferably 2 or more, still more preferably 3 or more, and still much more preferably 5 or more, and it is preferably 30 or less, more preferably 20 or less, still more preferably 16 or less, and still much more preferably 12 or less.

From the viewpoint of obtaining a lubricating oil composition having been more improved in scuffing resistance, $R^{c1}$ and $R^{c2}$ are each independently preferably an alkyl group among these, and from the viewpoint of obtaining a lubricating oil composition capable of effectively suppressing elution of copper by being improved in copper corrosion prevention together with scuffing resistance, they are each independently more preferably a branched chain alkyl group, and still more preferably a branched chain alkyl group having 5 or more carbon atoms.

From the above viewpoint, the number of carbon atoms of the branched chain alkyl group is preferably 5 or more, but it is more preferably 7 or more, still more preferably 8 or more, and still much more preferably 9 or more, and it is preferably 30 or less, more preferably 20 or less, still more preferably 16 or less, and still much more preferably 12 or less.

In the lubricating oil composition of one embodiment of the present invention, the total content of the compounds each of which is represented by any one of the general formulae (c-1) to (c-4) is preferably 60 to 100 mass %, more preferably 70 to 100 mass %, still more preferably 80 to 100 mass %, still much more preferably 90 to 100 mass %, and particularly preferably 95 to 100 mass %, based on the total amount (100 mass %) of the component (C) contained in the lubricating oil composition, from the viewpoint of obtaining a lubricating oil composition having been more improved in scuffing resistance.

In the lubricating oil composition of one embodiment of the present invention, the content of the compound represented by the general formula (c-1) is preferably 50 to 100 mass %, more preferably 60 to 100 mass %, still more preferably 70 to 100 mass %, still much more preferably 80 to 100 mass %, and particularly preferably 90 to 100 mass %, based on the total amount (100 mass %) of the component (C) contained in the lubricating oil composition, from the above viewpoint.

In the lubricating oil composition of one embodiment of the present invention, the content of a compound represented by the following general formula (c-x) is preferably less than 10 mass %, more preferably less than 8 mass %, still more preferably less than 5 mass %, still much more preferably less than 3 mass %, and particularly preferably less than 1 mass %, based on the total amount (100 mass %) of the component (C) contained in the lubricating oil composition.

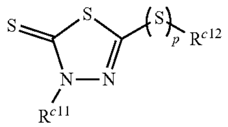

(C-X)

wherein $R^{c11}$ is a hydrogen atom or a methyl group, $R^{c12}$ is an alkyl group having 1 to 4 carbon atoms, and p is 0 or 1.

From the viewpoint of obtaining a lubricating oil composition having been more improved in scuffing resistance and having excellent copper corrosion resistance in both the liquid phase portion and the vapor phase portion, the component (C) preferably contains a thiadiazole-based compound (C1) having a branched chain alkyl group (also referred to as a "component (C1)" hereinafter) in the lubricating oil composition of one embodiment of the present invention.

From the above viewpoint, the content of the component (C1) is preferably 50 to 100 mass %, more preferably 60 to 100 mass %, more preferably 70 to 100 mass %, still more preferably 80 to 100 mass %, still much more preferably 90 to 100 mass %, and particularly preferably 95 to 100 mass %, based on the total amount (100 mass %) of the component (C) contained in the lubricating oil composition.

From the viewpoint of obtaining a lubricating oil composition having been more improved in scuffing resistance and having good copper elution suppressing effect, the number of carbon atoms of the branched chain alkyl group of the component (C1) is preferably 5 or more, more preferably 7 or more, still more preferably 8 or more, and still much more preferably 9 or more, and it is preferably 30 or less, more preferably 20 or less, still more preferably 16 or less, and still much more preferably 12 or less.

From the viewpoint of obtaining a lubricating oil composition having been more improved in scuffing resistance and having good copper elution suppressing effect, the component (C1) is preferably a compound represented by any of the aforementioned general formulae (c-1) to (c-4) wherein $R^{c1}$ and $R^{c2}$ are each independently a branched chain alkyl group, and is more preferably a compound represented by the aforementioned general formula (c-1) wherein $R^{c1}$ and $R^{c2}$ are each independently a branched chain alkyl group. A preferred range of the number of carbon atoms of the branched chain alkyl group is as previously described.

<Component (D): Benzotriazole-Based Compound>

The lubricating oil composition of one embodiment of the present invention contains, as the component (D), a benzotriazole-based compound. A lubricating oil composition having been improved in copper corrosion resistance can be obtained by containing the component (D).

In one embodiment of the present invention, the component (D) may be used singly, or may be used in combination of two or more.

From the viewpoint of obtaining a lubricating oil composition having been improved in copper corrosion resistance not only in the liquid phase portion where copper is in direct contact with the lubricating oil composition but also in the vapor phase portion where copper is not in direct contact with the lubricating oil composition but corrosion is attributable to a vaporized lubricating oil composition, the content of the component (D) in the lubricating oil composition of one embodiment of the present invention is 0.02 mass % or more based on the total amount (100 mass %) of the lubricating oil composition. If the content of the component (D) is less than 0.02 mass %, copper corrosion resistance in the vapor phase portion is not sufficiently improved.

On the other hand, the component (D) also causes lowering of scuffing resistance, so that by adjusting the content of the component (D) in the lubricating oil composition of one embodiment of the present invention to less than 0.20 mass % based on the total amount (100 mass %) of the lubricating oil composition, copper corrosion resistance in both the liquid phase portion and the vapor phase portion is improved, and moreover, scuffing resistance is favorably maintained to improve these in a balanced manner. If the content of the component (D) is 0.20 mass % or more, it becomes difficult to improve copper corrosion resistance in both the liquid phase portion and the vapor phase portion and scuffing resistance in a balanced manner.

From the viewpoint of obtaining a lubricating oil composition having been improved also in copper corrosion resistance in both the liquid phase portion and the vapor phase portion in a more balanced manner, the content of the component (D) in the lubricating oil composition of one embodiment of the present invention is preferably 0.023 mass % or more, more preferably 0.025 mass % or more, more preferably 0.027 mass % or more, more preferably 0.03 mass % or more, still more preferably 0.032 mass % or more, still more preferably 0.035 mass % or more, still more preferably 0.037 mass % or more, still much more preferably 0.040 mass % or more, and particularly preferably 0.042 mass % or more, based on the total amount (100 mass %) of the lubricating oil composition.

From the viewpoint of obtaining a lubricating oil composition having good scuffing resistance and having been improved in copper corrosion resistance in both the liquid phase portion and the vapor phase portion in a balanced manner, the content of the component (D) in the lubricating oil composition of one embodiment of the present invention is preferably 0.18 mass % or less, more preferably 0.16 mass % or less, more preferably 0.15 mass % or less, more preferably 0.13 mass % or less, still more preferably 0.11 mass % or less, still more preferably 0.10 mass % or less, still more preferably 0.09 mass % or less, still much more preferably 0.08 mass % or less, and particularly preferably 0.07 mass % or less, based on the total amount (100 mass %) of the lubricating oil composition.

From the viewpoint of obtaining a lubricating oil composition having been improved in copper corrosion resistance in both the liquid phase portion and the vapor phase portion and scuffing resistance in a more balanced manner, the content ratio [(D)/(B)] by mass of the component (D) to the component (B) in the lubricating oil composition of one embodiment of the present invention is preferably 0.05 or more, more preferably 0.07 or more, still more preferably 0.09 or more, still much more preferably 0.10 or more, and particularly preferably 0.12 or more, and it is preferably 0.60 or less, more preferably 0.50 or less, more preferably 0.45 or less, still more preferably 0.40 or less, still more preferably 0.35 or less, still much more preferably 0.30 or less, and particularly preferably 0.25 or less.

From the viewpoint of obtaining a lubricating oil composition having been improved in copper corrosion resistance in both the liquid phase portion and the vapor phase portion and scuffing resistance in a more balanced manner, the content ratio [(D)/(C)] by mass of the component (D) to the component (C) in the lubricating oil composition of one embodiment of the present invention is preferably 0.05 or more, more preferably 0.07 or more, still more preferably 0.09 or more, still much more preferably 0.10 or more, and particularly preferably 0.12 or more, and it is preferably 0.60 or less, more preferably 0.50 or less, more preferably 0.45 or less, still more preferably 0.40 or less, still more preferably 0.35 or less, still much more preferably 0.30 or less, and particularly preferably 0.25 or less.

The benzotriazole-based compound used as the component (D) in one embodiment of the present invention may be any compound as long as it is a compound having a benzotriazole structure, and is, for example, a compound represented by the following general formula (d-0).

(d-0)

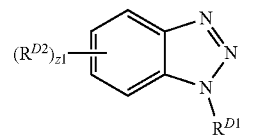

In the general formula (d-0), $R^{D1}$ is a hydrocarbon group which may contain at least one atom selected from the group consisting of an oxygen atom, a sulfur atom, and a nitrogen atom, or a hydrogen atom.

Each $R^{D2}$ is independently a hydrocarbon group which may contain at least one atom selected from the group consisting of an oxygen atom, a sulfur atom, and a nitrogen atom.

z1 is an integer of 0 to 4, preferably an integer of 0 to 2, more preferably an integer of 0 to 1, and still more preferably 1.

Examples of the hydrocarbon groups include an alkyl group, an alkenyl group, a cycloalkyl group, an aryl group, and a group of a combination of two or more of these groups.

The number of carbon atoms of the hydrocarbon group capable of being selected as $R^{D1}$ is, for example, 1 to 30, but it is preferably 3 or more, more preferably 6 or more, more preferably 8 or more, still more preferably 10 or more, still much more preferably 12 or more, and particularly preferably 15 or more, and it is preferably 28 or less, more preferably 26 or less, still more preferably 24 or less, still much more preferably 22 or less, and particularly preferably 20 or less.

The number of carbon atoms of the hydrocarbon group capable of being selected as $R^{D2}$ is, for example, 1 to 20, but it is preferably 1 to 16, more preferably 1 to 12, more preferably 1 to 8, still more preferably 1 to 6, still much more preferably 1 to 4, and particularly preferably 1 to 2.

Examples of the alkyl groups include a methyl group, an ethyl group, a propyl group (n-propyl group, i-propyl group), a butyl group (n-butyl group, i-butyl group, s-butyl group, t-butyl group), a pentyl group (n-pentyl group, i-pentyl group, neopentyl group), a hexyl group, a heptyl group, an octyl group, a 2-ethylhexyl group, a nonyl group, a decyl group, an undecyl group, a dodecyl group, a tridecyl group, a tetradecyl group, a pentadecyl group, a hexadecyl group, a heptadecyl group, and an octadecyl group.

The alkyl group may be a straight-chain alkyl group, or may be a branched chain alkyl group.

Examples of the alkenyl groups include an ethenyl group (vinyl group), a propenyl group, a butenyl group, a pentenyl group, a hexenyl group, a heptenyl group, an octenyl group, a nonenyl group, a decenyl group, a dodecenyl group, a tridecenyl group, a tetradecenyl group, a pentadecenyl group, a hexadecenyl group, and an octadecenyl group (oleyl group).

The alkenyl group may be a straight-chain alkenyl group, or may be a branched chain alkenyl group.

Examples of the cycloalkyl groups include a cyclopropyl group, a cyclobutyl group, a cyclopentyl group, a cyclohexyl group, a cycloheptyl group, a cyclooctyl group, and an adamantyl group.

Examples of the aryl groups include a phenyl group, a naphthyl group, an anthryl group, a phenanthryl group, a biphenyl group, a terphenyl group, and a phenylnaphthyl group.

The hydrocarbon group capable of being selected as $R^{D1}$ and $R^{D2}$ and containing at least one atom selected from the group consisting of an oxygen atom, a sulfur atom, and a nitrogen atom is, for example, a group represented by any of the following formulae (d-i) to (d-iii).

(d-i)

$$*—A^d—O—R^{d1}$$

(d-ii)

$$*—A^d—O—R^{d1}$$

(d-iii)

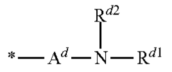

In the general formulae (d-i) to (d-iii), $A^d$ is a divalent hydrocarbon group, and $R^{d1}$ and $R^{d2}$ are each independently a monovalent hydrocarbon group.

Examples of the divalent hydrocarbon groups capable of being selected as $A^d$ include an alkylene group having 1 to 20 (preferably 1 to 12, more preferably 1 to 8, still more preferably 1 to 4, still much more preferably 1 to 2) carbon atoms, an alkenylene group having 2 to 20 (preferably 2 to 12, more preferably 2 to 8, still more preferably 2 to 4) carbon atoms, a cycloalkylene group having 3 to 20 (preferably 3 to 15, more preferably 5 to 12, still more preferably 5 to 6) ring-forming carbon atoms, and an arylene group having 6 to 30 (preferably 6 to 18, more preferably 6 to 15, still more preferably 6 to 12) ring-forming carbon atoms.

$A^d$ is preferably an alkylene group having 1 to 20 (preferably 1 to 12, more preferably 1 to 8, still more preferably 1 to 4, still much more preferably 1 to 2) carbon atoms, among these.

Examples of the monovalent hydrocarbon groups capable of being selected as $R^{d1}$ and $R^{d2}$ include an alkyl group having 1 to 20 (preferably 1 to 12, more preferably 1 to 8, still more preferably 1 to 4, still much more preferably 1 to 2) carbon atoms, an alkenyl group having 2 to 20 (preferably 2 to 12, more preferably 2 to 8, still more preferably 2 to 4) carbon atoms, a cycloalkyl group having 3 to 20 (preferably 3 to 15, more preferably 5 to 12, still more preferably 5 to 6) ring-forming carbon atoms, and an aryl group having 6 to 30 (preferably 6 to 18, more preferably 6 to 15, still more preferably 6 to 12) ring-forming carbon atoms.

$R^{d1}$ and $R^{d2}$ are each independently preferably an alkyl group having 1 to 20 (preferably 1 to 12, more preferably 1 to 8, still more preferably 1 to 4, still much more preferably 1 to 2) carbon atoms, among these.

The component (D) used in one embodiment of the present invention preferably contains a compound (D1) represented by the following general formula (d-1).

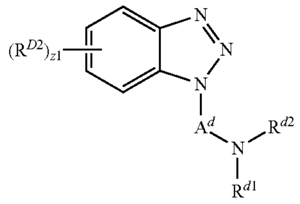

(d-1)

$R^{D2}$ and z1 in the general formula (d-1) are the same as $R^{D2}$ and z1 in the aforementioned general formula (d-0), and embodiments of preferred groups are also the same. Further, $A^d$, $R^{d1}$, and $R^{d2}$ are the same as $A^d$, $R^{d1}$, and $R^{d2}$ in the aforementioned general formula (d-iii), and embodiments of preferred groups are also the same.

In the general formula (d-1) in a preferred embodiment of the compound (D1), each $R^{D2}$ is independently an alkyl group having 1 to 20 (preferably 1 to 16, more preferably 1 to 12, more preferably 1 to 8, still more preferably 1 to 6, still much more preferably 1 to 4, particularly preferably 1 to 2) carbon atoms, $A^d$ is an alkylene group having 1 to 20 (preferably 1 to 12, more preferably 1 to 8, still more preferably 1 to 4, still much more preferably 1 to 2) carbon atoms, and $R^{d1}$ and $R^{d2}$ are each independently an alkyl group having 1 to 20 (preferably 1 to 12, more preferably 1 to 8, still more preferably 1 to 4, still much more preferably 1 to 2) carbon atoms. z1 is an integer of 0 to 4 (preferably an integer of 0 to 2, more preferably an integer of 0 to 1, still more preferably 1).

In the lubricating oil composition of one embodiment of the present invention, the content of the component (D1) in the component (D) is preferably 60 to 100 mass %, more preferably 70 to 100 mass %, still more preferably 80 to 100 mass %, still much more preferably 90 to 100 mass %, and particularly preferably 95 to 100 mass %, based on the total amount (100 mass %) of the component (D) contained in the lubricating oil composition.

<Additives Other than Components (B) to (D)>

The lubricating oil composition of one embodiment of the present invention may contain additives other than the components (B) to (D) when needed as long as the effects of the present invention are not impaired.

Examples of such other additives include a pour point depressant, a viscosity index improver, an antioxidant, a metal-based detergent, a dispersant, an anti-rust agent, and an anti-foaming agent.

These other additives may be each used singly, or may be each used in combination of two or more.

The contents of these other lubricating oil additives can be each appropriately adjusted as long as the effects of the present invention are not impaired, and the contents of the additives are each independently usually 0.001 to 15 mass %, preferably 0.005 to 10 mass %, and more preferably 0.01 to 5 mass %, based on the total amount (100 mass %) of the lubricating oil composition.

[Pour Point Depressant]

The lubricating oil composition of one embodiment of the present invention may further contain a pour point depressant. The pour point depressant may be used singly, or may be used in combination of two or more.

Examples of the pour point depressants used in one embodiment of the present invention include an ethylene-vinyl acetate copolymer, a condensate of chlorinated paraffin and naphthalene, a condensate of chlorinated paraffin and phenol, polymethacrylate, and polyalkylstyrene.

The mass-average molecular weight (Mw) of the pour point depressant used in one embodiment of the present invention may be 5,000 or more, 7,000 or more, 10,000 or more, 15,000 or more, 20,000 or more, 25,000 or more, 30,000 or more, 35,000 or more, 40,000 or more, 45,000 or more, 50,000 or more, 55,000 or more, or 60,000 or more, and it may be 150,000 or less, 120,000 or less, 100,000 or less, 90,000 or less, or 80,000 or less.

[Viscosity Index Improver]

The lubricating oil composition of one embodiment of the present invention may further contain a viscosity index improver. The viscosity index improver may be used singly, or may be used in combination of two or more.

Examples of the viscosity index improvers used in one embodiment of the present invention include polymers, such as non-dispersion type polymethacrylate, dispersion type polymethacrylate, an olefin-based copolymer (for example, ethylene-propylene copolymer), a dispersion type olefin-based copolymer, and a styrene-based copolymer (for example, styrene-diene copolymer, styrene-isoprene copolymer).

The weight-average molecular weight (Mw) of the viscosity index improver used in one embodiment of the present invention may be 5,000 or more, 7,000 or more, 10,000 or more, 15,000 or more, or 20,000 or more, and it may be 1,000,000 or less, 700,000 or less, 500,000 or less, 300,000 or less, 200,000 or less, 100,000 or less, or 50,000 or less.

[Antioxidant]

The lubricating oil composition of one embodiment of the present invention may further contain an antioxidant. The antioxidant may be used singly, or may be used in combination of two or more.

Examples of the antioxidants used in one embodiment of the present invention include amine-based antioxidants, such as alkylated diphenylamine, phenylnaphthylamine, and alkylated phenylnaphthylamine; phenol-based antioxidants, such as 2,6-di-t-butylphenol, 4,4'-methylenebis(2,6-di-t-butylphenol), isooctyl-3-(3,5-di-t-butyl-4-hydroxyphenyl) propionate, and n-octadecyl-3-(3,5-di-t-butyl-4-hydroxyphenyl)propionate; and sulfur-based antioxidants, such as phenothiazine, dioctadecyl sulfide, dilauryl-3,3'-thiodipropionate, and 2-mercaptobenzimidazole.

[Metal-Based Detergent]

The lubricating oil composition of one embodiment of the present invention may further contain a metal-based detergent. The metal-based detergent may be used singly, or may be used in combination of two or more.

Examples of the metal-based detergents used in one embodiment of the present invention include metal salts, such as a metal sulfonate, a metal salicylate, and a metal phenate. The metal to constitute the metal salts is preferably a metal atom selected from alkali metals and alkaline earth metals, more preferably sodium, calcium, magnesium or barium, and still more preferably calcium.

In the lubricating oil composition of one embodiment of the present invention, the metal-based detergent preferably contains one or more selected from calcium sulfonate, calcium salicylate and calcium phenate, and more preferably contains calcium sulfonate.

The content of the calcium sulfonate is preferably 50 to 100 mass %, more preferably 60 to 100 mass %, still more preferably 70 to 100 mass %, and still much more preferably 80 to 100 mass %, based on the total amount (100 mass %) of the metal-based detergent contained in the lubricating oil composition.

The base number of the metal-based detergent is preferably 0 to 600 mgKOH/g.

In the lubricating oil composition of one embodiment of the present invention, however, the metal-based detergent is preferably an overbased metal-based detergent having a base number of 100 mgKOH/g or more.

The base number of the overbased metal-based detergent is 100 mgKOH/g or more, but it is preferably 150 to 500 mgKOH/g, and more preferably 200 to 450 mgKOH/g.

In the present specification, the "base number" means a base number measured by perchloric acid method in accordance with JIS K2501:2003 "Petroleum products and lubricants—Determination of neutralization number", 9.

[Dispersant]

From the viewpoint of improving dispersibility of the components (B) to (D), the lubricating oil composition of one embodiment of the present invention may further contain a dispersant. The dispersant may be used singly, or may be used in combination of two or more.

The dispersant used in one embodiment of the present invention is preferably an alkenyl succinimide, and examples thereof include an alkenyl bis-succinimide represented by the following general formula (e-1) and an alkenyl mono-succinimide represented by the following general formula (e-2).

(e-1)

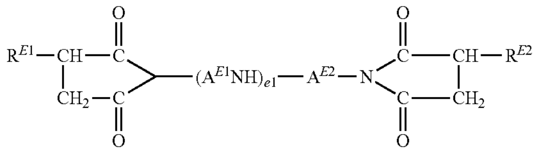

(e-2)

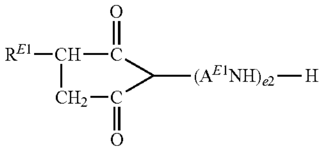

In the general formulae (e-1) and (e-2), $R^{E1}$, $R^{E2}$, and $R^{E3}$ are each independently an alkenyl group having a mass-average molecular weight (Mw) of 500 to 3000 (preferably 900 to 2500).

Examples of the alkenyl groups capable of being selected as $R^{E1}$, $R^{E2}$, and $R^{E3}$ include a polybutenyl group, a polyisobutenyl group, and an ethylene-propylene copolymer, and among these, a polybutenyl group or a polyisobutenyl group is preferable.

$A^{E1}$, $A^{E2}$, and $A^{E3}$ are each independently an alkylene group having 2 to 5 carbon atoms.

e1 is an integer of 0 to 10, preferably an integer of 1 to 4, and more preferably 2 or 3.

e2 is an integer of 1 to 10, preferably an integer of 2 to 5, and more preferably 3 or 4.

The compound represented by the general formula (e-1) or (e-2) may be a modified alkenyl succinimide obtained by the reaction with one or more selected from a boron compound, an alcohol, an aldehyde, a ketone, an alkylphenol, a cyclic carbonate, an epoxy compound, an organic acid, and the like.

[Anti-Rust Agent]

The lubricating oil composition of one embodiment of the present invention may further contain an anti-rust agent. The anti-rust agent may be used singly, or may be used in combination of two or more.

Examples of the anti-rust agents used in one embodiment of the present invention include a fatty acid, an alkenyl succinic acid half ester, a fatty acid soap, an alkyl sulfonic acid salt, a polyhydric alcohol fatty acid ester, a fatty acid amine, oxidized paraffin, and an alkyl polyoxyethylene ether.

[Anti-Foaming Agent]

The lubricating oil composition of one embodiment of the present invention may further contain an anti-foaming agent. The anti-foaming agent may be used singly, or may be used in combination of two or more.

Examples of the anti-foaming agents used in one embodiment of the present invention include an alkyl silicone-based anti-foaming agent, a fluorosilicone-based anti-foaming agent, and a fluoroalkyl ether-based anti-foaming agent.

<Method for Producing Lubricating Oil Composition>

The method for producing a lubricating oil composition of one embodiment of the present invention is not particularly limited, but from the viewpoint of productivity, the method preferably has a step of adding the components (B) to (D), and if needed, additives other than the components (B) to (D), to the component (A).

Here, preferred compounds and amounts of the components (A) to (D) and additives other than these are as previously described.

The additives, such as the viscosity index improver, the pour point depressant, and the anti-foaming agent, are each preferably added in a state of being dissolved in a diluent oil.

[Properties of Lubricating Oil Composition]

From the viewpoint of obtaining a lubricating oil composition having been not only decreased in resistance to stirring but also improved in cooling properties, the kinematic viscosity of the lubricating oil composition of one embodiment of the present invention at 100° C. is preferably 5.0 $mm^2/s$ or less, more preferably 4.8 $mm^2/s$ or less, more preferably 4.6 $mm^2/s$ or less, more preferably 4.4 $mm^2/s$ or less, still more preferably 4.2 $mm^2/s$ or less, still more preferably 4.0 $mm^2/s$ or less, still much more preferably 3.8 $mm^2/s$ or less, and particularly preferably 3.6 $mm^2/s$ or less, or may be 3.5 $mm^2/s$ or less, 3.4 $mm^2/s$ or less, 3.3 $mm^2/s$ or less, 3.2 $mm^2/s$ or less, 3.1 $mm^2/s$ or less, or 3.0 $mm^2/s$ or less, and from the viewpoint of obtaining a lubricating oil composition having been not only more improved in scuffing resistance and insulation properties but also increased in flash point and thereby having excellent handling properties, it is preferably 2.0 $mm^2/s$ or more, more preferably 2.2 $mm^2/s$ or more, still more preferably 2.4 $mm^2/s$ or more, still much more preferably 2.6 $mm^2/s$ or more, and particularly preferably 2.8 $mm^2/s$ or more.

The viscosity index of the lubricating oil composition of one embodiment of the present invention is preferably 80 or more, more preferably 90 or more, still more preferably 100 or more, still much more preferably 110 or more, and particularly preferably 115 or more.

[Use Application of Lubricating Oil Composition]

The lubricating oil composition of one preferred embodiment of the present invention can be improved in scuffing resistance and copper corrosion resistance in a balanced manner.

Taking such characteristics into consideration, the lubricating oil composition of one embodiment of the present invention can be preferably used for lubrication in mechanisms, such as a torque converter, a wet clutch, a gear bearing mechanism, an oil pump and a hydraulic control mechanism, which are incorporated in various apparatuses, such as an engine, a transmission, a speed reducer, a compressor and a hydraulic system.

The lubricating oil composition of one embodiment of the present invention is preferably used for lubrication of various mechanisms of an electrically driven unit including at least a gearbox and an electric motor, among these. The electrically driven unit is mounted on fuel-cell-powered vehicles, electric vehicles, and hybrid vehicles.

When the lubricating oil composition of one embodiment of the present invention is applied to the electrically driven unit, the lubricating oil composition plays a role in cooling of an electric motor and lubrication of a gearbox. Particularly, the lubricating oil composition of one embodiment of the present invention also has such characteristics that since it is excellent in scuffing resistance and copper corrosion resistance, it improves lubrication properties of a gearbox, and since it has excellent copper corrosion resistance, it can prevent corrosion of a copper-based member for constituting an electric motor even if it is used for cooling the electric motor.

When the aforementioned characteristics of the lubricating oil composition of one embodiment of the present invention are taken into consideration, the present invention can also provide the following [1] and [2].

[1] An electrically driven unit filled with the aforementioned lubricating oil composition of one embodiment of the present invention, and comprising at least a gearbox and an electric motor.

[2] A method for using a lubricating oil composition, in which the lubricating oil composition of one embodiment of the present invention is applied to an electrically driven unit comprising at least a gearbox and an electric motor.

Preferred embodiments of the lubricating oil composition described in the above [1] and [2] are as previously described.

EXAMPLES

Next, the present invention will be described in much more detail with reference to Examples, but the present invention is in no way limited to these Examples. Measuring methods for various properties are as follows.

(1) Kinematic Viscosity, Viscosity Index

The kinematic viscosity and viscosity index were measured and calculated in accordance with JIS K2283:2000.

(2) Content of Phosphorus Atoms

The content was measured in accordance with JPI-5S-38-92.

(3) Content of Nitrogen Atoms

The content was measured in accordance with JIS K2609.

(4) Content of Sulfur Atoms

The content was measured in accordance with JIS K2541-6:2013.

(5) Base Number (Perchloric Acid Method)

The base number was measured in accordance with JIS K2501:2003 (perchloric acid method).

(6) Weight-Average Molecular Weight (Mw)

The weight-average molecular weight was measured under the following conditions using a gel permeation chromatograph (manufactured by Agilent Technologies, "1260 type HPLC"), and a value measured in terms of standard polystyrene was used.

(Measurement Conditions)

Column: Two of "Shodex LF404" that are sequentially connected.

Column temperature: 35° C.

Developing solvent: chloroform

Flow rate: 0.3 mL/min

Examples 1 to 4, Comparative Examples 1 to 6

The components (A) to (D) and other additives shown in Table 2 were added in amounts shown in Table 2, and they were sufficiently mixed to prepare each lubricating oil composition. Details of each component used in the preparation of the lubricating oil composition are as follows.

<Component (A)>

"Mineral oil (a1)": 60N mineral oil classified into Group II of API base oil categories, 100° C. kinematic viscosity=2.2 $mm^2/s$, viscosity index=108.

"Mineral oil (a2)": 100N mineral oil classified into Group III of API base oil categories, 100° C. kinematic viscosity=4.2 $mm^2/s$, viscosity index=122.

<Component (B)>

"Phosphorous acid ester (b)": mixture of sulfur atom-containing phosphorous acid esters obtained by mixing a compound corresponding to the component (B11) of the aforementioned general formula (b-11) wherein a1=2, and $R^{b1}$=n-octyl group (compound represented by the following formula (b-11-1)) and a compound corresponding to the component (B21) of the aforementioned formula (b-21)

wherein a2=a3=2, and $R^{b2}$, $R^{b3}$=n-octyl group (compound represented by the following formula (b-21-1)), in a component (B11)/component (B21) ratio=9/1 (by mass); sulfur atom content=10.7 mass %, phosphorus atom content=10 mass %.

<Component (C)>

"Thiadiazole (c)": 2,5-bis(1,1-dimethylheptyldithio)-1,3,4-thiadiazole, thiadiazole of the aforementioned general formula (c-1) wherein m=n=2, and $R^1$ and $R^2$ are each a 1,1-dimethylheptyl group (compound represented by the following formula (c-1-1)); sulfur atom content=33.3 mass %, nitrogen atom content=6.4 mass %.

<Component (D)>

"Benzotriazole (d)": N,N-bis(2-ethylhexyl)aminomethyl-1H-methylbenzotriazole, benzotriazole of the aforementioned general formula (d-1) wherein $R^{D2}$ is a methyl group, d1=1, $A^d$ is a methylene group, and $R^{d1}$ and $R^{d2}$ are each a n-octyl group (compound represented by the following formula (d-1-1)).

(b-11-1)

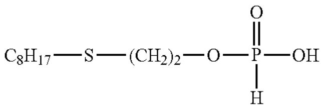

(b-21-1)

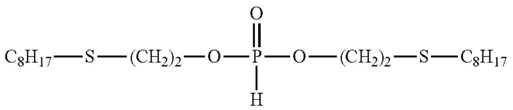

(c-1-1)

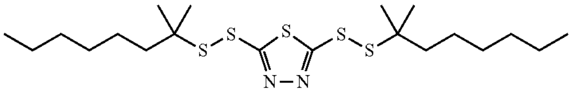

-continued (d-1-1)

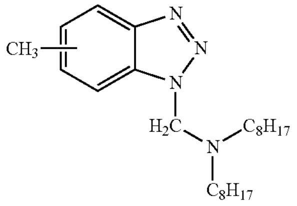

<Other Additives>

"Additive mixture": additive mixture consisting of pour point depressant, antioxidant, metal-based detergent, dispersant, friction modifier, and anti-foaming agent.

Regarding the lubricating oil compositions prepared, the kinematic viscosity and viscosity index were measured or calculated, and the following test was carried out. The results of them are set forth in Table 2.

(1) FZG Scuffing Test (A10/16.6R/90)

A load was stepwise increased based on the regulations using an A10 type gear under the conditions of a sample oil temperature of 90° C., a rotational speed of 2900 rpm and an operating time of about 7.5 minutes in accordance with ASTM D5182, and when scuffing occurred, a stage of the load was determined. It can be said that the larger the value of the stage is, the better the scuffing resistance of the lubricating oil composition becomes.

(2) Liquid Phase Copper Corrosion Resistance Test

Copper strip corrosion test was carried out under the conditions of a test temperature of 150° C. and a test time of 3 hours in accordance with a test tube method of JIS K2513 "Petroleum products—Corrosiveness to copper—Copper strip test", then a state of tarnish of the copper strip was observed, and the copper corrosion resistance in a liquid phase was evaluated based on "Table 1—Classification of corrosion standards" of JIS K 2513 shown in Table 1 below. In Table 2, the result is described as "classification number (subdivision symbol)", and regarding the classification number, a smaller number indicates lower copper corrosion resistance, and the degree of corrosion progress is shown in alphabetical order.

TABLE 1

| Classification | Designation | Description | |
|---|---|---|---|
| Freshly polished strip | — | | The freshly polished strip is included in the series only as an indication of the appearance of a properly polished strip before a test run. It is not possible to duplicate this appearance after a test run with a completely non-corrosion sample. |
| 1 | Slight tarnish | (a) | Light orange, almost the same as a freshly polished strip |
| | | (b) | Dark orange |
| 2 | Moderate tarnish | (a) | Claret red |
| | | (b) | Lavender |
| | | (c) | Multicoloured with lavender blue and/or silver overlaid on claret red |
| | | (d) | Silvery |
| | | (e) | Brassy or gold |
| 3 | Dark tarnish | (a) | Magenta overcast on brassy strip |
| | | (b) | Multicoloured with red and green showing (peacock), but no grey |
| 4 | Corrosion | (a) | Transparent black, dark grey or brown with peacock green barely showing |
| | | (b) | Graphite or lustreless black |
| | | (c) | Glossy or jet black |

(3) Vapor Phase Copper Corrosion Resistance Test

In a container filled with 250 ml of the lubricating oil composition of each example or each comparative example, a copper strip (30 mm×10 mm×0.5 mm) was hung at a height of 10 mm from a liquid surface so as not to come into contact with the liquid surface, and the copper strip was allowed to stand for 24 hours while the lubricating oil composition was maintained at 170° C. Whether the copper strip was corroded or not after standing for 24 hours was evaluated based on the following criteria. It can be said that the smaller the ratio of an area of the copper strip having been corroded and black-tarnished is, the better the copper corrosion resistance in the vapor phase is.

A: The area of the copper strip having been corroded and black-tarnished was less than 10%.

B: The area of the copper strip having been corroded and black-tarnished was 10% or more and less than 50%.

C: The area of the copper strip having been corroded and black-tarnished was 50% or more.

TABLE 2

| | | | | Example 1 | Example 2 | Example 3 | Example 4 | Comparative Example 1 | Comparative Example 2 |
|---|---|---|---|---|---|---|---|---|---|
| Formulation of Lubricating oil composition | Component (A) | Mineral oil (a1) | mass % | 63.40 | 63.42 | 63.35 | 63.60 | 63.45 | 63.45 |
| | | Mineral oil (a2) | mass % | 33.00 | 33.00 | 33.00 | 33.00 | 33.00 | 33.00 |
| | Component (B) | Phosphorous acid ester (b) | mass % | 0.30 | 0.30 | 0.30 | 0.30 | 0.30 | 0.30 |
| | Component (C) | Thiadiazole (c) | mass % | 0.30 | 0.30 | 0.30 | 0.10 | 0.30 | 0.30 |
| | Component (D) | Benzotriazole (d) | mass % | 0.05 | 0.03 | 0.10 | 0.05 | — | 0.005 |
| | Other components | Additive mixture | mass % | 2.95 | 2.95 | 2.95 | 2.95 | 2.95 | 2.95 |
| | Total | | mass % | 100.00 | 100.00 | 100.00 | 100.00 | 100.00 | 100.00 |
| | Component (D)/component (B) | | mass % | 0.17 | 0.10 | 0.33 | 0.17 | 0 | 0.02 |
| | Component (D)/component (C) | | mass % | 0.17 | 0.10 | 0.33 | 0.50 | 0 | 0.02 |
| | Content of sulfur atom-free phosphorous acid ester | | mass % | 0.00 | 0.00 | 0.00 | 0.00 | 0.00 | 0.00 |
| | Content of sulfur atom-free phosphoric acid ester | | mass % | 0.00 | 0.00 | 0.00 | 0.00 | 0.00 | 0.00 |
| | Content of monoester-based base oil | | mass % | 0.00 | 0.00 | 0.00 | 0.00 | 0.00 | 0.00 |
| Various properties | 40° C. kinematic viscosity of lubricating oil composition | | $mm^2/s$ | 11.4 | 11.5 | 11.5 | 11.3 | 11.4 | 11.4 |
| | 100° C. kinematic viscosity of lubricating oil composition | | $mm^2/s$ | 3.0 | 3.0 | 3.0 | 3.0 | 3.0 | 3.0 |
| | Viscosity index of lubricating oil composition | | — | 122 | 119 | 119 | 125 | 122 | 122 |
| Test results | FZG scuffing test, stage | | — | 7 | 7 | 5 | 6 | 9 | 8 |
| | Liquid phase copper corrosion resistance test | | — | 2(a) | 2(a) | 2(a) | 2(a) | 2(a) | 2(a) |
| | Vapor phase copper corrosion resistance test | | — | A | A | A | A | C | B |

| | | | | Comparative Example 3 | Comparative Example 4 | Comparative Example 5 | Comparative Example 6 |
|---|---|---|---|---|---|---|---|
| Formulation of Lubricating oil composition | Component (A) | Mineral oil (a1) | mass % | 63.44 | 63.25 | 63.70 | 63.10 |
| | | Mineral oil (a2) | mass % | 33.00 | 33.00 | 33.00 | 33.00 |
| | Component (B) | Phosphorous acid ester (b) | mass % | 0.30 | 0.30 | 0.30 | 0.30 |
| | Component (C) | Thiadiazole (c) | mass % | 0.30 | 0.30 | — | 0.60 |
| | Component (D) | Benzotriazole (d) | mass % | 0.01 | 0.20 | 0.05 | 0.05 |
| | Other components | Additive mixture | mass % | 2.95 | 2.95 | 2.95 | 2.95 |
| | Total | | mass % | 100.00 | 100.00 | 100.00 | 100.00 |
| | Component (D)/component (B) | | mass % | 0.03 | 0.67 | 0.17 | 0.17 |
| | Component (D)/component (C) | | mass % | 0.03 | 0.67 | — | 0.08 |
| | Content of sulfur atom-free phosphorous acid ester | | mass % | 0.00 | 0.00 | 0.00 | 0.00 |
| | Content of sulfur atom-free phosphoric acid ester | | mass % | 0.00 | 0.00 | 0.00 | 0.00 |
| | Content of monoester-based base oil | | mass % | 0.00 | 0.00 | 0.00 | 0.00 |
| Various properties | 40° C. kinematic viscosity of lubricating oil composition | | $mm^2/s$ | 11.4 | 11.5 | 11.3 | 11.4 |
| | 100° C. kinematic viscosity of lubricating oil composition | | $mm^2/s$ | 3.0 | 3.0 | 3.0 | 3.0 |
| | Viscosity index of lubricating oil composition | | — | 122 | 119 | 125 | 122 |

TABLE 2-continued

| | | | | | | |
|---|---|---|---|---|---|---|
| Test results | FZG scuffing test, stage | — | 8 | 4 | 4 | 4 |
| | Liquid phase copper corrosion resistance test | — | 2(a) | 2(a) | 2(a) | 2(a) |
| | Vapor phase copper corrosion resistance test | — | B | A | A | C |

From Table 2, the results for the lubricating oil compositions prepared in Examples 1 to 4 were superior not only in scuffing resistance but also in copper corrosion resistance in both the liquid phase and the vapor phase. In contrast, the results for Comparative Examples 1 to 3 and 6 were inferior in copper corrosion resistance in the vapor phase portion though the results were good in copper corrosion resistance in the liquid phase portion. The results for Comparative Examples 4 to 6 were inferior in scuffing resistance.

The invention claimed is:

1. A lubricating oil composition, comprising:

(A) a base oil;

(B) a phosphorous acid ester comprising a sulfur atom-comprising group comprising (i) 2 to 20 carbon atoms and (ii) a —$(S)_x$— group with x being an integer of 1 or more between two adjacent carbon atoms in a structure of an alkyl group;

(C) a thiadiazole-based compound; and (D) a benzotriazole-based compound, wherein the thiadiazole-based compound (C) is present in a range of from 0.25 to less than 0.60 mass %, based on total lubricating oil composition mass, wherein the benzotriazole-based compound (D) is present in a range of from 0.02 to less than 0.20 mass %, based on the total lubricating oil composition mass, and wherein a content of a monoester-based base oil is less than 3.0 mass %, based on total base oil (A) mass comprised in the lubricating oil composition.

2. The composition of claim 1, wherein the sulfur atom-comprising group has formula (b-i):

$$R^b—(S)_x-A^b-* \quad \text{(b-i)}$$

wherein $R^b$ is a straight-chain or branched chain alkyl group, $A^b$ is a straight-chain or branched chain alkylene group, $R^b$ and $A^b$ have a total number of carbon atoms in a range of from 2 to 20, x is an integer of 1 or more, and

* is a bonding position.

3. The composition of claim 1, wherein the phosphorous acid ester (B) is present in a range of from 0.01 to 2.00 mass %, based on the total lubricating oil composition mass.

4. The composition of claim 1, wherein a (D)/(C) mass content ratio of the benzotriazole-based compound (D) to the thiadiazole-based compound (C) is in a range of from 0.05 to 0.60.

5. The lubricating oil composition of claim 1, wherein a (D)/(B) mass content ratio of the benzotriazole-based compound (D) to the phosphorous acid ester (B) is in a range of from 0.05 to 0.60.

6. The lubricating oil composition of claim 1, wherein a content of a sulfur atom-free phosphorous acid ester is less than 0.10 mass %, based on the total lubricating oil composition mass.

7. The lubricating oil composition of claim 1, wherein a content of a sulfur atom-free phosphoric acid ester is less than 0.10 mass %, based on the total lubricating oil composition mass.

8. The composition of claim 1, having a kinematic viscosity at 100° C. of 4.0 $mm^2/s$ or less.

9. The composition of claim 1, which is configured for an electrically driven unit comprising a gearbox and an electric motor.

10. An electrically driven unit, comprising:

the lubricating oil composition of claim 1 filled in the electrically driven unit;

a gearbox; and an electric motor.

11. A method for using a lubricating oil composition, the method comprising:

applying the lubricating oil composition of claim 1 to an electrically driven unit, wherein the electrically driven unit comprises a gearbox and an electric motor.

12. The composition of claim 1, wherein the monoester-based base oil is present in less than 2.5 mass %, based on the total base oil (A) mass comprised in the lubricating oil composition.

13. The composition of claim 1, wherein the monoester-based base oil is present in less than 0.5 mass %, based on the total base oil (A) mass comprised in the lubricating oil composition.

14. The composition of claim 1, wherein the base oil (A) is present in a range of from 30 to 99.9 mass %, based on the total lubricating oil composition mass.

* * * * *